(12) United States Patent
Yi

(10) Patent No.: US 7,012,340 B2
(45) Date of Patent: Mar. 14, 2006

(54) APPARATUS FOR CONVERTING OCEAN WAVE ENERGY INTO ELECTRIC POWER

(75) Inventor: Jwo-Hwu Yi, Tainan (TW)

(73) Assignee: Kun Shan University, Yung-Kang (TW)

( * ) Notice: Subject to any disclaimer, the term of this patent is extended or adjusted under 35 U.S.C. 154(b) by 70 days.

(21) Appl. No.: 10/645,381

(22) Filed: Aug. 21, 2003

(65) Prior Publication Data
US 2004/0239120 A1 Dec. 2, 2004

(30) Foreign Application Priority Data
Jun. 2, 2003 (TW) .............................. 92114972 A

(51) Int. Cl.
F03B 13/12 (2006.01)
E02B 9/08 (2006.01)
B63H 1/38 (2006.01)
H02K 33/00 (2006.01)

(52) U.S. Cl. ............................ 290/42; 290/53; 290/54
(58) Field of Classification Search ................. 290/42, 290/53–54
See application file for complete search history.

(56) References Cited

U.S. PATENT DOCUMENTS

| | | | | | |
|---|---|---|---|---|---|
| 3,011,062 | A | * | 11/1961 | Goldsmith | 290/53 |
| 3,696,251 | A | * | 10/1972 | Last et al. | 290/53 |
| 3,783,302 | A | * | 1/1974 | Woodbridge | 290/42 |
| 3,965,365 | A | * | 6/1976 | Parr | 290/53 |
| 4,110,630 | A | * | 8/1978 | Hendel | 290/53 |
| 4,191,893 | A | * | 3/1980 | Grana et al. | 290/53 |
| 4,260,901 | A | * | 4/1981 | Woodbridge | 290/42 |
| 4,291,234 | A | * | 9/1981 | Clark | 290/53 |
| 4,423,334 | A | * | 12/1983 | Jacobi et al. | 290/53 |
| 5,552,657 | A | * | 9/1996 | Epstein et al. | 310/339 |
| 5,696,413 | A | * | 12/1997 | Woodbridge et al. | 310/15 |
| 6,020,653 | A | * | 2/2000 | Woodbridge et al. | 290/53 |
| 6,644,027 | B1 | * | 11/2003 | Kelly | 60/498 |
| 6,731,018 | B1 | * | 5/2004 | Grinsted et al. | 290/42 |
| 6,833,631 | B1 | * | 12/2004 | Van Breems | 290/42 |
| 6,849,963 | B1 | * | 2/2005 | Grinsted et al. | 290/42 |
| 6,864,592 | B1 | * | 3/2005 | Kelly | 290/42 |
| 2004/0251692 | A1 | * | 12/2004 | Leijon et al. | 290/42 |

* cited by examiner

Primary Examiner—Darren Schuberg
Assistant Examiner—Pedro J. Cuevas
(74) Attorney, Agent, or Firm—Alan D. Kamrath; Nikolai & Mersereau, P.A.

(57) ABSTRACT

An ocean wave energy conversion apparatus includes a float adapted to ride on the surface of the ocean in reciprocal vertical motion in response to ocean wave front action and a lever adapted to ride on the surface of the ocean. The lever has one end coupled to the float. A fulcrum pivotally supports the lever. A magnet is coupled to the other end of the lever. Parallel stator cores having electric coils wound thereon together with the magnet form a magnetic circuit. Springs are adjacent the magnet and interconnected to the lever and the magnet. A barrier is disposed between adjacent stator cores. The upward motion of the float caused by impact of waves will move the magnet downward by the lever and compresses the springs. Downward motion of the float will move the magnet upward by the lever and expand the springs. Repeated movement of the magnet will induce a voltage in the electric coils.

4 Claims, 4 Drawing Sheets

APPARATUS FOR CONVERTING OCEAN WAVE ENERGY INTO ELECTRIC POWER

BACKGROUND OF THE INVENTION

1. Field of the Invention

The present invention relates to energy conversion and more particularly to an apparatus for converting ocean wave energy into electric power with improved characteristics.

2. Description of Related Art

It is known that waves move up and down or back and forth with a curving motion. Ocean wave power plants have been developed by placing a power generator unit on a float in the sea. Electricity is generated by the generator by absorbing energy of waves as the waves continuously move therethrough. Conventionally, a hydraulic turbine or gas turbine is installed in a wave power generator. A turbine is a rotary device per se. This gives an impression that electricity can be generated only by a turbine or the like. The prior turbine based electricity generation suffered from several disadvantages. For example, energy of waves is converted into high pressure liquid or air which in turn impinges the vanes of a hydraulic turbine or gas turbine for rotating the same. Finally, the generator is driven by the hydraulic turbine or gas turbine for generating electricity. Such multiple energy conversions can consume energy significantly, i.e., lower energy conversion efficiency. Further, they can complicate the electric generation system, resulting in an increase in the installation and maintenance costs.

U.S. Pat. No. 4,178,517 disclosed a process for conversion of ocean wave energy into electric power and an apparatus in which wave motion is used to vary the pressure of hydrogen gas in one of the cavities of a two-cavity chamber. The resulting imbalance of pressures in the cavities is relieved by conduction of hydrogen ions through a protonic conductor separating the cavities, and by conduction of electrons through an external circuit, enabling hydrogen gas to be formed on the low-pressure side of the chamber. The conduction of electrons constitutes an electric current. Also, U.S. Pat. No. 5,136,173 disclosed an ocean wave energy conversion system in which electricity is generated by flowing sea water through a magnet hydrodynamic electric generator. Both patents have the generator installed under sea level. This is not desirable.

Thus, continuing improvements in the exploitation of the conversion of ocean wave energy into electric power are constantly being sought.

SUMMARY OF THE INVENTION

It is an object of the present invention to provide an apparatus for converting ocean wave energy into electric power. A comprising a floating section includes a float adapted to ride on the surface of the ocean in reciprocal vertical motion in response to ocean wave front action and a lever adapted to ride on the surface of the ocean. The lever has one end coupled to the float. A fixed section is mounted on a seacoast, ship, or production platform and includes a fulcrum for pivotally supporting the lever. A magnet is coupled to the other end of the lever and moveable therewith. A plurality of parallel stator cores together with the magnet form a magnetic circuit. An electric coil is wound on each of the stator cores. Resilient means are adjacent the magnet and interconnected to the lever and the magnet. A barrier is disposed between adjacent stator cores. An upward motion of the float caused by the impact of waves will move the magnet downward by the leverage of the lever and will compress the resilient means. Downward motion of the float will move the magnet upward by the leverage of the lever and expand the resilient means. Repetition of the upward and the downward movements of the magnet will induce a voltage in the electric coils.

It is another object of the present invention to provide an apparatus for converting ocean wave energy into electric power. Support means are mounted on a fixed section mounted on a dam, seacoast, or breakwater. An intermediate vibration member has a lower portion submerged in the seawater. The intermediate vibration member includes a driving shaft rotatably coupled to the support means. A magnet is on top of the vibration member. A plurality of parallel stator cores together with the magnet form a magnetic circuit. An electric coil is wound on each of stator cores. Left and right resilient means are disposed adjacent the magnet and coupled to the intermediate vibration member. A barrier is disposed between adjacent stator cores. Sideways movement of the vibration member caused by the impact of waves will compress one of the resilient means while expanding the other resilient means via the driving shaft so as to move the magnet Repetition of sideways movements of the magnet will induce a voltage in the electric coils.

The above and other objects, features and advantages of the present invention will become apparent from the following detailed description taken with the accompanying drawings.

DETAILED DESCRIPTION OF THE PREFERRED EMBODIMENTS

Figure 1:
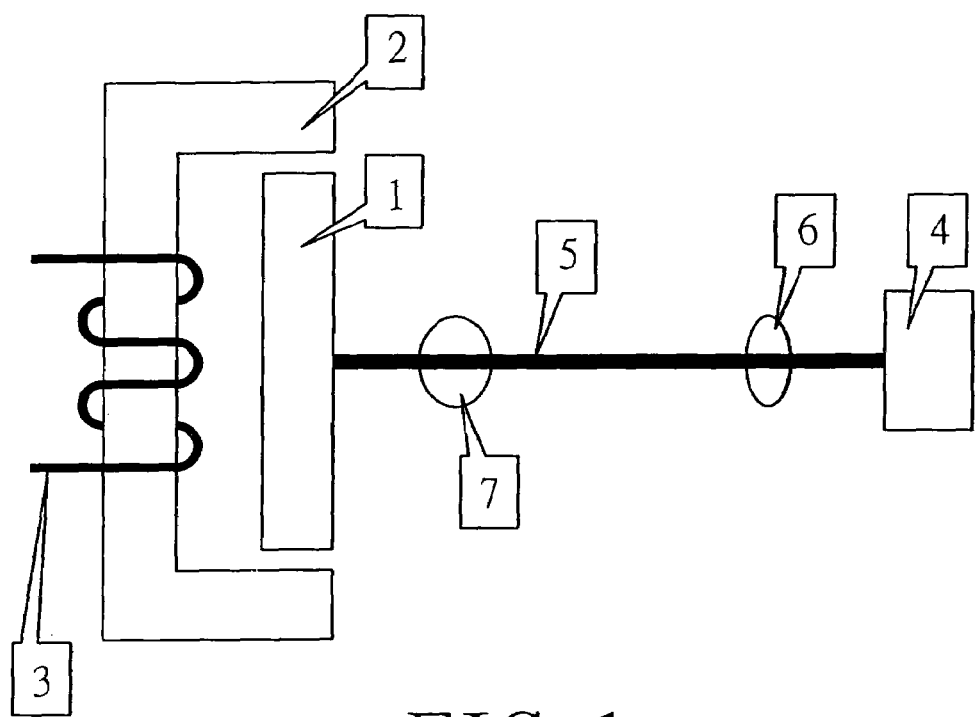
FIG. 1 schematically depicts a top plan view of a first preferred embodiment of an ocean wave energy conversion apparatus according to the invention.
Figure 2:
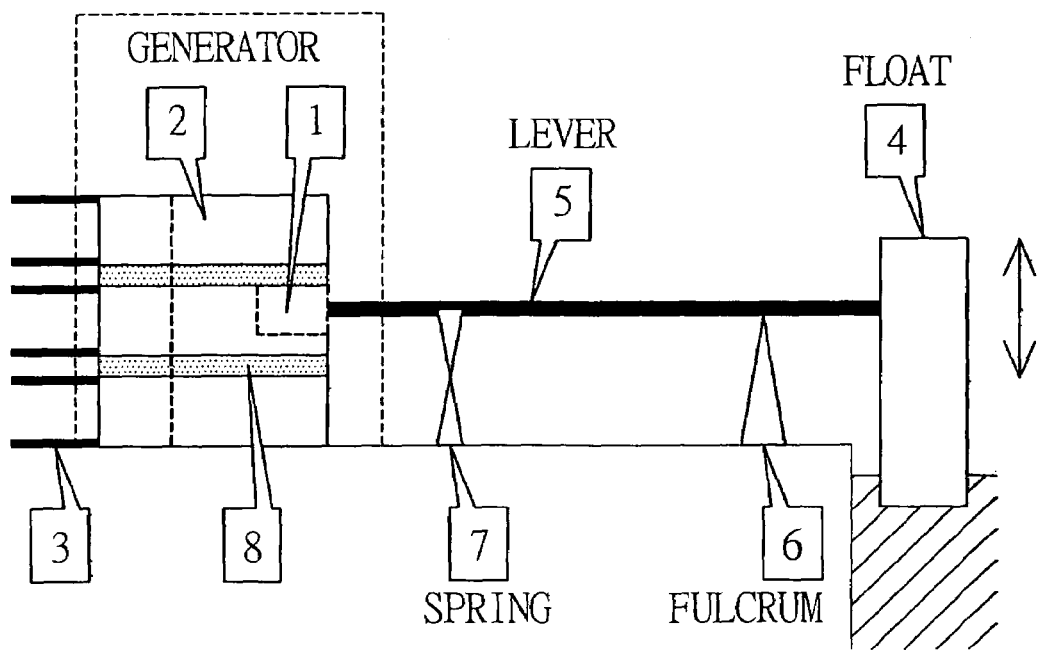
FIG. 2 schematically depicts a front view of the apparatus shown in FIG. 1.

Referring to FIGS. 1 and 2, there is shown an apparatus constructed in accordance with a first preferred embodiment of the invention. The apparatus comprises a float 4 adapted to ride on the surface of the ocean in reciprocal vertical motion in response to ocean wave front action, and a lever 5 also adapted to ride on the surface of the ocean. The lever 5 has one end coupled to the float 4. On a seacoast, ship, or production platform, the apparatus further comprises a fulcrum 6 pivotally supporting the lever 5. A magnet 1 is coupled to the other end of the lever 5. A plurality of (three shown) parallel stator cores 2 together with the magnet 1 form a magnetic circuit. A plurality of (three shown) parallel electric coils 3 are wound on the stator cores 2. A spring 7 is located adjacent the magnet 1 and interconnected to the lever 5 and the magnet 1. Each of a plurality of barriers 8 is disposed between adjacent stator cores 2.

The characteristics of the first preferred embodiment are detailed below. The conventional hydraulic turbine or gas turbine is not provided. In operation, upward motion of the float 4 caused by the impact of waves will cause the magnet 1 to move downward by the leverage of the lever 5 and compresses the spring 7 simultaneously. Further, downward motion of the float 4 will cause the magnet 1 to move upward by the leverage of the lever 5 and expands the spring 7 simultaneously. Such reciprocal motion of the magnet 1 will induce a voltage (i.e., current) in the coils 3 since the coils 3 cut lines of magnetic flux (i.e., magnetic flux change). As a result, electricity is generated by ocean wave energy.

Figure 3:
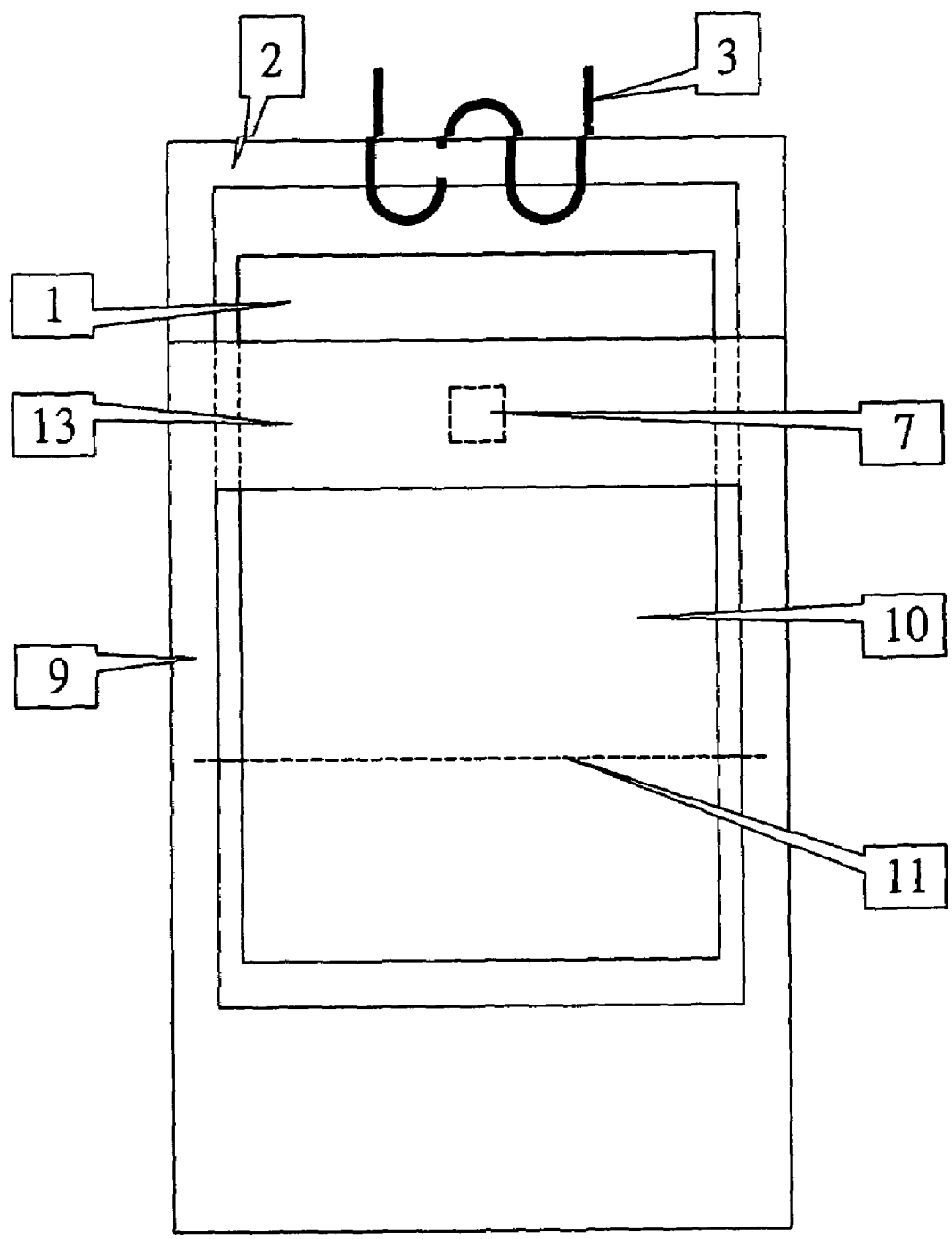
FIG. 3 schematically depicts a front view of a second preferred embodiment of an ocean wave energy conversion apparatus according to the invention.
Figure 4:
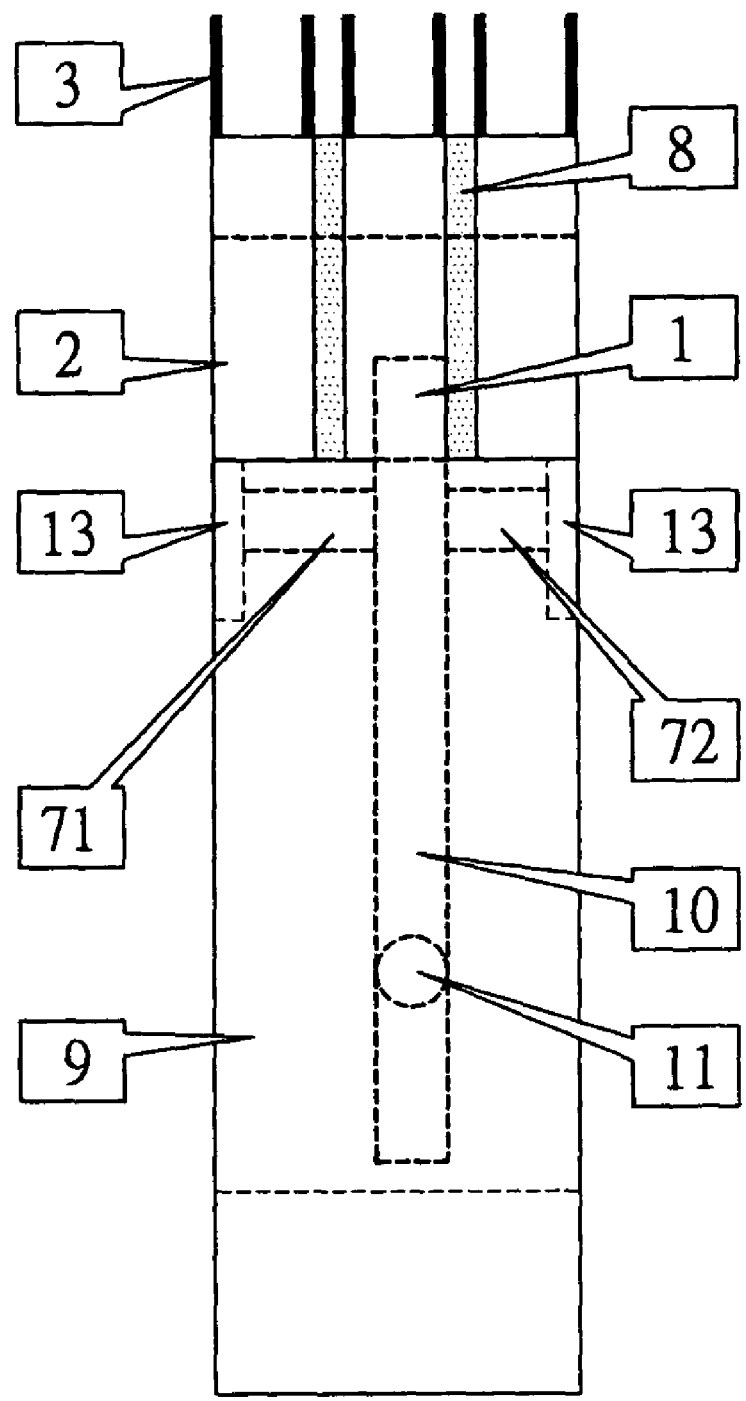
FIG. 4 schematically depicts a side plan view of the apparatus shown in FIG. 3.

Referring to FIGS. 3 and 4, there is shown an apparatus constructed in accordance with a second preferred embodiment of the invention. The apparatus comprises a support mechanism 9 mounted on a seacoast, dam, or breakwater. A vibration member 10 has a lower portion submerged in the seawater. The vibration member 10 includes a driving shaft 11 rotatably coupled to the support mechanism 9. A magnet 1 is located on top of the vibration member 10. A plurality of (three shown) parallel stator cores 2 are on top of the support mechanism 9. The stator cores 2 together with the magnet 1 form a magnetic circuit. A plurality of (three shown) parallel electric coils 3 are wound on the stator cores 2. A left spring 71 and a right spring 72 are coupled to the vibration member 10, with the intermediate vibrator member 10 being intermediate the springs 71 and 72. Each of a plurality of barriers 8 is disposed between adjacent stator cores 2. As shown, the spring 71 and 72 act between the intermediate vibration member 10 and the parts 13 of the support mechanism 9.

The characteristics of the second preferred embodiment are detailed below. Also, the conventional hydraulic turbine or gas turbine is not provided. In operation, movement of the vibration member 10 in one direction about the axis of the driving shaft 11 will compress the left spring 71 and expand the right spring 72 simultaneously. Movement of the vibration member 10 in the opposite direction will compress the right spring 72 and expand the left spring 71 simultaneously. In turn, the magnet 1 moves. Such reciprocal motion of the magnet 1 will induce a voltage (i.e., current) in the coils 3 since the coils 3 cut the lines of magnetic flux (i.e., magnetic flux change). As a result, electricity is generated by ocean wave energy.

According to Faraday's law of induction, the induced voltage is proportional to the number of coil turns. However, the electrical resistance is also proportional to the number of coil turns. Hence, it is preferable to increase the diameter of the coil for significantly reducing the electrical resistance as the number of coil turns increases. Moreover, the induced voltage is also proportional to the magnetic flux change in the coil. Also, the magnetic flux is proportional to the magnetic intensity, the cross-section of the magnetic circuit, and the magnetic permeability of the magnetic circuit. Thus, increase of the magnetic permeability, the cross-section of the magnetic circuit and the magnetic inductivity of magnetic circuit can increase induced voltage. In addition, an increase in the rate of movement of the magnet can increase the magnetic flux change.

In the first preferred embodiment, the distance of movement of the float 4 will be equal to that of the magnet 1 in upward or downward movement if there is no provision of the lever 5. Fortunately as devised by the present invention, distance of movement of the magnet 1 is greater than that of the float 4 in upward or downward movement since the distance from the magnet 1 to the fulcrum 6 is greater than the distance from the float 4 to the fulcrum 6 as taught by leverage. Accordingly, the magnetic flux change in the magnetic circuit can be increased significantly. Likewise, in the second preferred embodiment, the distance from the driving shaft 11 to the magnet 1 at the top of the vibration member 10 is greater than the distance from the driving shaft 11 to the bottom of the vibration member 10 as devised by the present invention. This also increases the amount of movement of the magnet 1 and thus increases the magnetic flux change in the magnetic circuit.

Additionally, the induced voltage will be smaller if the electric coils 3 are not wound on the stator cores 2 since the magnetic permeability of air is very small. Fortunately, the induced voltage will be very large since the stator core 2 has a high magnetic permeability as embodied in each of the first and second preferred embodiments. In a case that there is only one pair of magnet 1 and stator core 2, no line of magnetic flux will be cut when the magnet 1 leaves the effective magnetic area of the stator core 2. That is, the magnetic flux is not changed and thus there is no induced voltage. This is not desirable. Thus, as stated above, a plurality of parallel sets of stator cores 2 and electric coils 3 are provided by the present invention in which each of the plurality of barriers 8 is disposed between two adjacent stator cores 2. Hence, the magnetic flux change can be increased significantly. Preferably, the cross-section of the magnet 1 is about the same as that of the stator core 2 so as to obtain the maximum magnetic flux change in operation.

Figure 5:
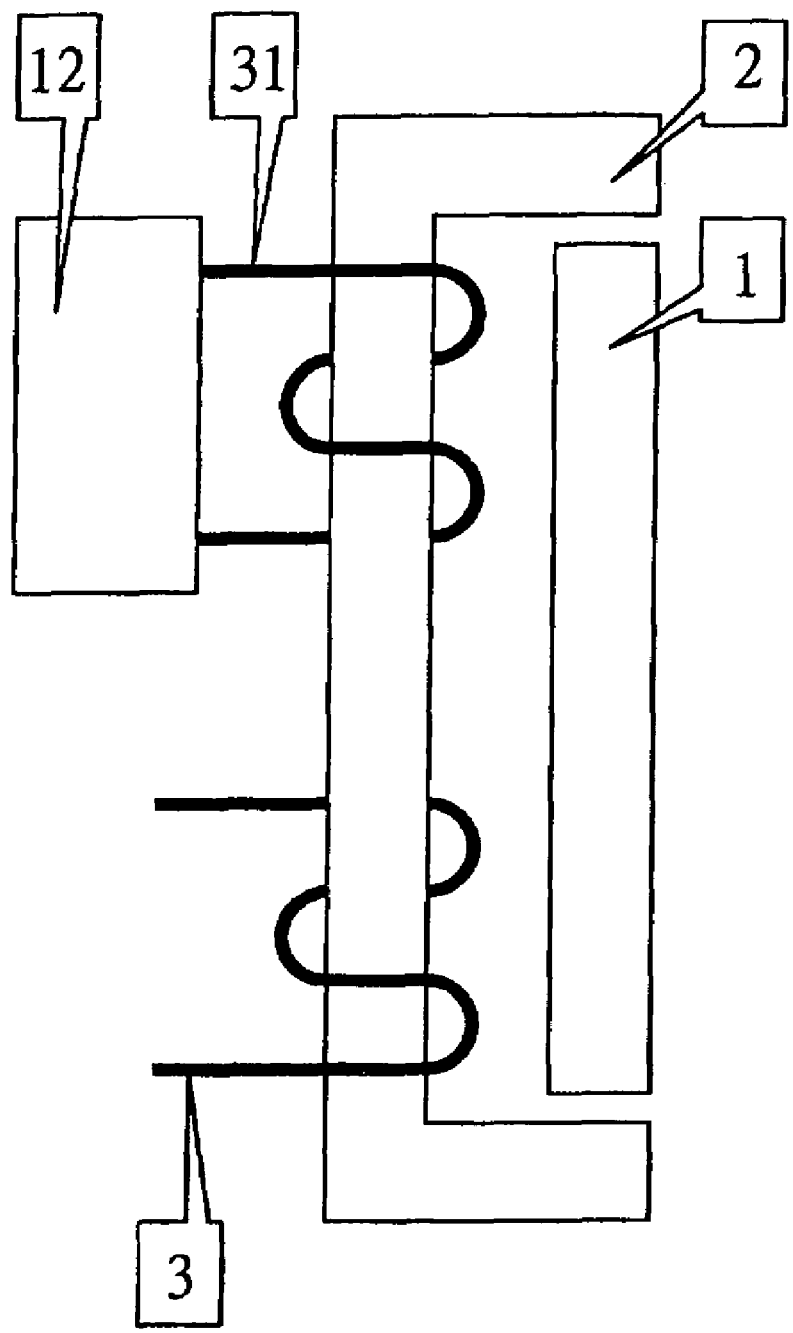
FIG. 5 schematically depicts a top plan view of electrically connecting an external power source to the coil for providing an additional magnetic field according to the invention.

A small voltage will be induced if the magnet 1 is a permanent magnet due to smaller magnetic intensity. Fortunately, referring to FIG. 5, as embodied by the present invention, the magnet 1 is formed of the same ferromagnetic material as the stator core 2 with the magnetic field around each of the stator cores 2 generated by another electric coil 31 wound thereon. The coil 31 is in turn electrically coupled to an external power source 12. As a result, the induced voltage is greatly increased due to the larger magnetic flux change.

As to the problem of unstable electricity generated by an ocean wave energy conversion process as experienced in the prior art, it can be solved by many commercially available, advanced power electronic devices. This is similar to those used in connection with wind turbine electricity production.

While the invention herein disclosed has been described by means of specific embodiments, numerous modifications and variations could be made thereto by those skilled in the art without departing from the scope and spirit of the invention set forth in the claims.

What is claimed is:

1. An apparatus for converting ocean wave energy into electric power, comprising:

a float adapted to ride on the surface of the ocean in reciprocal vertical motion in response to ocean wave front action;

a lever adapted to ride on the surface of the ocean, the lever having a first end coupled to the float;

a fulcrum for pivotally supporting the lever;

a magnet coupled to a second end of the lever, with the fulcrum located intermediate the first and second ends of the lever, with the magnet movable about an arc defined by an axis of the fulcrum;

resilient means adjacent the magnet and interconnected to the lever and the magnet;

a plurality of stator cores together with the magnet forming a magnetic circuit;

an electric coil wound on each of the plurality of stator cores, wherein the stator cores and the electric coils wound thereon are parallel and perpendicular to the arc; and a barrier is disposed between and abutting each adjacent stator cores, whereby upward motion of the float caused by impact of the waves will move the magnet downward by the leverage of the lever and compress the resilient means, downward motion of the float will move the magnet by the leverage of the lever and expand the resilient means, and repeated upward and downward motions of the magnet will induce a voltage in the electric coils.

2. The apparatus of claim 1, wherein the magnet and the plurality of stator cores are formed of a same ferromagnetic material, with the apparatus further comprising a second electric coil wound on each of the plurality of stator cores, and an external power source electrically coupled to the second electric coils.

3. An apparatus for converting ocean wave energy into electric power, comprising:

support means mounted on a fixed section;

an intermediate vibration member having a lower portion submerged in the ocean, the intermediate vibration member including a driving shaft rotatably coupled to the support means about an axis;

a magnet on top of the vibration member, with the magnet movable about an arc defined by the axis of the driving shaft;

left and right resilient means adjacent the magnet and coupled to the intermediate vibration member;

a plurality of stator cores together with the magnet forming a magnetic circuit;

an electric coil wound on each of the stator cores, wherein the stator cores and the electric coils wound thereon are parallel and perpendicular to the arc; and a barrier is disposed between and abutting each adjacent stator cores, whereby a vibration of the intermediate vibration member caused by impact of waves will compress the left resilient means and expand the right resilient means via the driving shaft so as to move the magnet, and repeating of the movement of the magnet will induce a voltage in the electric coils.

4. The apparatus of claim 3, wherein the magnet and the plurality of stator cores are formed of a same ferromagnetic material, with the apparatus further comprising a second electric coil wound on each of the plurality of stator cores, and an external power source electrically coupled to the second electric coils.

* * * * *